May 18, 1926.

R. W. STUMBAUGH

BUSHING REPLACER

Filed Sept. 26, 1925

1,585,176

Inventor
R. W. Stumbaugh
By Frederick S. Still,
Attorney

Patented May 18, 1926.

1,585,176

UNITED STATES PATENT OFFICE.

ROY W. STUMBAUGH, OF HAGERSTOWN, MARYLAND.

BUSHING REPLACER.

Application filed September 26, 1925. Serial No. 58,782.

This invention relates to bushing replacers and more particularly to a device for replacing the bushings of the cylinders of locomotives.

An important object of the invention is to provide means whereby an air, electric motor or the like may be employed as a source of power for forcing the bushing into its applied position.

It is well known that locomotive bushings are extremely difficult to apply and that the ordinary method of application is a lengthy process during which the bushing is often severely battered with the result that its efficiency is impaired and that a relatively heavy boring operation is necessary after the bushing is inserted to true up the bushing. All of these bushings after insertion have to be bored to true them up and accordingly an important object of the invention is to provide means whereby a boring machine may be employed and a nut for driving the bushing in position substituted for the ordinary boring bar and provide the means for applying the bushing. Thus, when the bushing is applied, the boring machine is already at hand to perform the necessary operation of boring.

These and other objects I attain by the construction shown in the accompanying drawings, wherein for the purpose of illustration is shown a preferred embodiment of my invention and wherein:—

Figure 1:
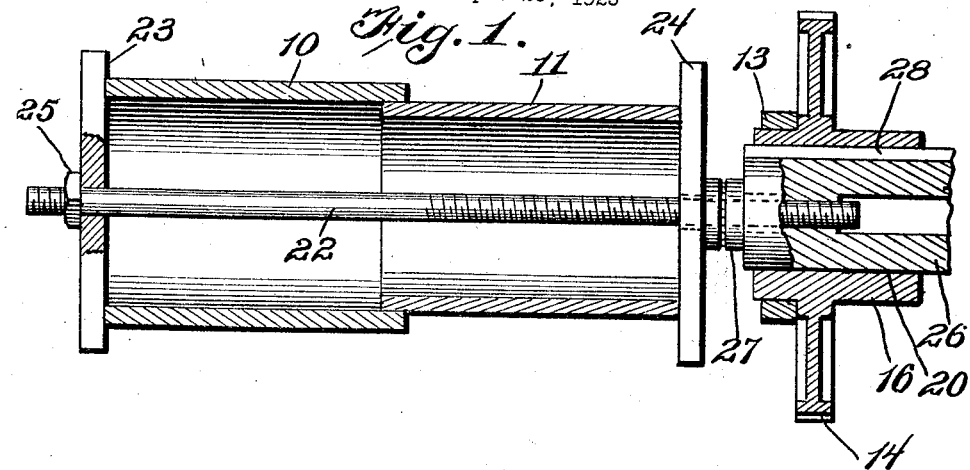
Figure 1 is a longitudinal sectional view showing apparatus constructed in accordance with my invention applied to force a bushing into an engine cylinder.
Figure 2:
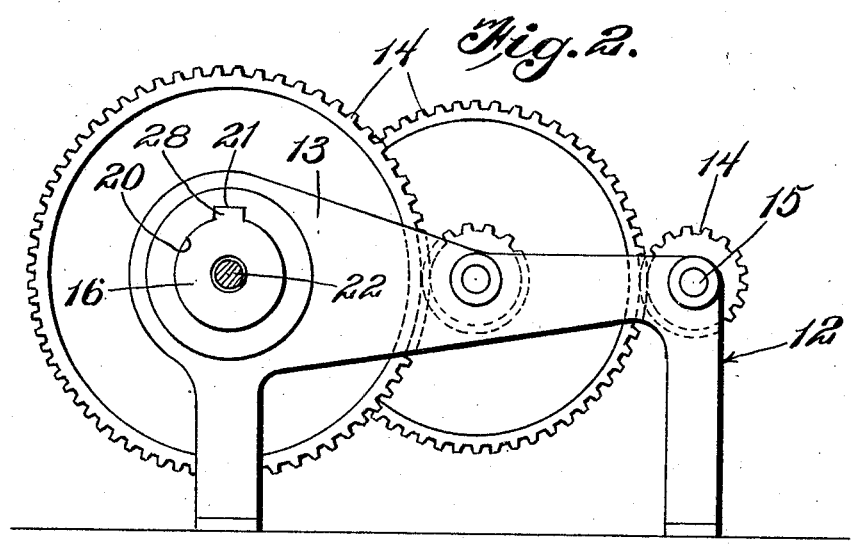
Figure 2 is an elevation showing the rod 22 in section and illustrating the type of machine employed for operating the nut.
Figure 3:
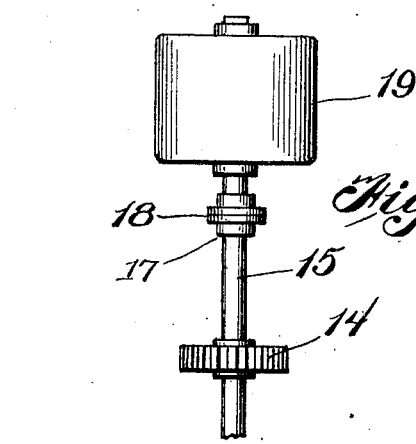
Figure 3 is a view showing the manner of connecting a driving agent with the machine.

Referring now more particularly to the drawings, the numeral 10 generally designates a locomotive cylinder and 11 a bushing to be inserted therein. The numeral 12 generally designates a boring machine for truing up the bushing after the same has been inserted. This boring machine consists of a suitably supported bar 13 having a gear train 14 mounted thereon including an input shaft 15 and an output shaft 16. The input shaft is adapted, as at 17, for engagement in the chuck 18 of an air or electric motor 19 while the output shaft has an axial bore 20 adapted for the reception of a boring bar (not shown) and having a keyway 21 formed in the wall of this bore.

In accordance with my invention, I provide a threaded bar 22 which is adapted to extend through the combined lengths of the cylinder 10 and bushing 11. In combination with this bar, I provide a pair of butt blocks 23 and 24 adapted to abut the end of the cylinder and the end of the bushing 11 respectively. The block 23 is held against longitudinal movement upon the bar by means of a nut 25 or the like or this block may be directly threaded upon the bar 22. The block 24 has a bore permitting passage of the bar 22 so that this block may slide upon the bar 22. I further provide a nut 26 which is threaded upon the bar 22 at the end thereof upon which the block 24 is arranged, a thrust bearing 27 being disposed between the nut 26 and the block 24. This nut is exteriorly formed as a cylinder fitting the boring bar opening 20 of the boring machine and is provided with a key 28 for engagement in the keyway 21 in the wall of the bore 20. It will be obvious that by applying the air motor to the gear train of the boring machine, the nut 26 may be rotated and by its rotation will be advanced longitudinally of the threaded bar 22, forcing the bushing before it and into the cylinder 10 as it advances. The bore 20 being open at its opposite end provides for the passage of the threaded bar 22 during this operation.

It will be obvious that by employing a machine of this character, the operation of inserting the bushing will be materially shortened and in addition will not tend to batter the bushing as when the bushing is inserted in the ordinary manner. It will also be obvious that the type of boring machine employed may be very readily altered and accordingly while I have illustrated a particular type of machine in common use in railroad shops for boring cylinder bushings, I do not wish to be limited to the particular structure illustrated except as hereinafter claimed.

I claim:—

1. In a device for replacing cylinder bushings and the like and in combination with a rotatable member having an opening therethrough, a nut splined in the opening of the rotatable member, a bar threaded through said nut, a pair of blocks upon said bar and means for holding one of the blocks against movement.

2. In a device for replacing cylinder bushings and the like and in combination with a rotatable member having an opening therethrough, a nut splined in the opening of the rotatable member, a bar threaded through said nut, a pair of blocks upon said bar and means for holding one of the blocks against movement, a rigid support for the rotatable member, and means on said support for rotating the rotatable member.

In testimony whereof I affix my signature.

ROY W. STUMBAUGH.